(12) United States Patent
Yoshida et al.

(10) Patent No.: US 12,450,521 B2
(45) Date of Patent: Oct. 21, 2025

(54) LEARNING DEVICE, LEARNING METHOD, AND STORAGE MEDIUM FOR LEARNING DEVICE

(71) Applicant: NEC Corporation, Tokyo (JP)

(72) Inventors: Shuhei Yoshida, Tokyo (JP); Makoto Terao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 683 days.

(21) Appl. No.: 17/801,554

(22) PCT Filed: Mar. 13, 2020

(86) PCT No.: PCT/JP2020/011157
§ 371 (c)(1),
(2) Date: Aug. 23, 2022

(87) PCT Pub. No.: WO2021/181668
PCT Pub. Date: Sep. 16, 2021

(65) Prior Publication Data
US 2023/0177389 A1 Jun. 8, 2023

(51) Int. Cl.
*G06N 20/00* (2019.01)
(52) U.S. Cl.
CPC .................................. *G06N 20/00* (2019.01)
(58) Field of Classification Search
CPC ..................................................... G06N 20/00
See application file for complete search history.

(56) References Cited

U.S. PATENT DOCUMENTS 12,020,147 B2 * 6/2024 Durand et al. ............ G06N 3/08
2023/0162049 A1 * 5/2023 Hall et al. ................. G06N 5/02

OTHER PUBLICATIONS

International Search Report for PCT Application No. PCT/JP2020/011157, mailed on Jun. 9, 2020.
Jesús Cid-Sueiro et al., "Consistency of Losses for Learning from Weak Labels", ECML PKDD 2014, 2014, pp. 197-210.
Jesús Cid-Sueiro, "Proper losses for learning from partial labels", In: Advances in Neural Information Processing Systems 25 (NIPS 2012), Dec. 8, 2012, pp. 1-9.

* cited by examiner

*Primary Examiner* — Neveen Abel Jalil

(57) ABSTRACT

A recognition loss calculation unit of a learning device calculates a recognition loss using: a recognition result with respect to recognition object data in a learning data set that is a set of a pair of the recognition object data and a weak label; a mixing matrix calculated based on the learning data set; and the weak label attached to the recognition object data. The recognition loss calculation unit includes: a difference calculation unit that calculates a difference between a mixing matrix and the recognition result; and a sum of squares calculation unit that calculates the recognition loss by calculating a sum of a square of the difference.

6 Claims, 6 Drawing Sheets

LEARNING DEVICE, LEARNING METHOD, AND STORAGE MEDIUM FOR LEARNING DEVICE

This application is a National Stage Entry of PCT/JP2020/011157 filed on Mar. 13, 2020, the contents of all of which are incorporated herein by reference, in their entirety.

TECHNICAL FIELD

The present invention relates to a learning device, a learning method, and a storage medium for a learning device.

BACKGROUND ART

In recent years, recognition techniques using machine learning have come to show extremely high performance mainly in the field of image recognition. The high accuracy of recognition techniques on the basis of machine learning is supported by a large amount of learning data annotated with correct answers. However, the cost involved in data collection and correct answer annotation is high, and, in particular, the cost involved in annotating correct answers in multi-class classification increases as the number of classes increases.

Non-Patent Document 1 proposes a technique used in multi-class classification in which, instead of attaching to all recognition objects a true correct label indicating the class to which they belong, a data set having attached thereto a weak label that is probabilistically determined from the true correct label is used. However, for learning, Non-Patent Document 1 uses a loss function that is calculated by summing semi-positive definite functions where a mixing matrix including a negative component serves as a weight, and this causes overfitting of the data that makes a negative contribution to the loss function.

PRIOR ART DOCUMENTS

Non-Patent Documents

Non-Patent Document 1: Cid-Sueiro, J., Garcia-Garcia, D., and Santos-Rodriguez, R., "Consistency of losses for learning from weak labels", in ECML-PKDD, 2014.

SUMMARY OF THE INVENTION

Problems to be Solved by the Invention

An object of the present disclosure is to provide a learning device, a learning method, and a storage medium for a learning device that improve the relevant techniques mentioned above.

Means for Solving the Problem

A learning device according to an example embodiment of the present disclosure includes: a recognition loss calculation means that calculates a recognition loss using: a recognition result with respect to recognition object data in a learning data set that is a set of a pair of the recognition object data and a weak label; a mixing matrix calculated based on the learning data set; and the weak label attached to the recognition object data, the learning data set includes a weak label probability distribution, the weak label probability distribution is a probability distribution followed by the weak label conditioned by a true correct answer class to which the recognition object data belongs, and has a left inverse matrix when the weak label is regarded as a row index and the true correct answer class is regarded as a column index, and the recognition loss calculation means includes: a difference calculation means that calculates a difference between the mixing matrix and the recognition result; and a sum of squares calculation means that calculates the recognition loss by calculating a sum of a square of the difference.

A learning method executed by a computer according to an example embodiment of the present disclosure includes: a recognition loss calculation step of calculating a recognition loss using: a recognition result with respect to recognition object data in a learning data set that is a set of a pair of the recognition object data and a weak label; a mixing matrix calculated based on the learning data set; and the weak label attached to the recognition object data, the learning data set includes a weak label probability distribution, the weak label probability distribution is a probability distribution followed by the weak label conditioned by a true correct answer class to which the recognition object data belongs, and has a left inverse matrix when the weak label is regarded as a row index and the true correct answer class is regarded as a column index, and the recognition loss calculation step includes: a difference calculation step of calculating a difference between the mixing matrix and the recognition result; and a sum of squares calculation steps of calculating the recognition loss by calculating a sum of a square of the difference.

A storage medium for a learning device according to an example embodiment of the present disclosure has recorded therein a program which causes a computer to execute a learning method including: a recognition loss calculation step of calculating a recognition loss using: a recognition result with respect to recognition object data in a learning data set that is a set of a pair of the recognition object data and a weak label; a mixing matrix calculated based on the learning data set; and the weak label attached to the recognition object data, the learning data set includes a weak label probability distribution, the weak label probability distribution is a probability distribution followed by the weak label conditioned by a true correct answer class to which the recognition object data belongs, and has a left inverse matrix when the weak label is regarded as a row index and the true correct answer class is regarded as a column index, and the recognition loss calculation step includes: a difference calculation step of calculating a difference between the mixing matrix and the recognition result; and a sum of squares calculation steps of calculating the recognition loss by calculating a sum of a square of the difference.

EMBODIMENTS FOR CARRYING OUT THE INVENTION

Figure 1A:
FIG. 1A shows an example of a normal data set in a case of a multi-class classification problem.

Hereinafter, preferred example embodiments of the present invention will be described, with reference to the drawings.

[Weak Label Data Set]

First, a data set having attached thereto a weak label that is used in the example embodiment of the present invention (hereinafter, referred to as "weak label data set") will be described.

In the present example embodiment, multi-class classification that classifies an element x of a data space X into a correct answer class y, which is an element of a correct answer candidate set Y is considered.

A normal learning data set in a multi-class classification problem is a set D of combinations (x, y) where data x is an element of a data space X and a correct answer class y is an element of a correct answer candidate set Y, and is represented in a form of

[Equation 1]

$$D=\{(x_i,y_i)\}_{i=1}^{N} \quad (1)$$

as in Equation (1) above.

The weak label data set is a set $D_w$ of combinations (x, z) where data x is an element of a data space X and a weak label z is an element of a weak label set Z, and it is represented in a form of

[Equation 2]

$$D_w=\{(x_i,z_i)\}_{i=1}^{N} \quad (2)$$

as in Equation (2) above and includes a weak label probability distribution represented as Equation (3) below.

[Equation 3]

$$p(z|y) \quad (3)$$

As the weak label probability distribution, it is limited to one having a mixing matrix H that satisfies Equation (4) below.

[Equation 4]

$$\Sigma_{z \in Z} H_{yz} p(z|y')=1[y=y'] \quad (4)$$

Here, it takes a value 1 when y and y' are equal, and a value 0 when they are different. The weak label z attached to the data x, which is an element of the data space X, is an element of the weak label set Z, and is determined from the true correct answer class y to which the data x belongs, according to the weak label probability distribution. That is to say, when the true class to which data $x_i$ belongs is $y_i$, the probability of a weak label $z_i$ being attached to the data $x_i$ is determined by using the weak label probability distribution of Equation (3) represented as Equation (5) below.

[Equation 5]

$$p(z_i|y_i) \quad (5)$$

The weak label $z_i$ actually attached is the realization of a weak label $z_i$ sampled according to Equation (5).

Next, an expert data set and a PU data set will be described as specific examples of the weak label data set. For these specific examples, there is a mixing matrix that satisfies Equation (4). However, the weak label data set used in the example embodiment of the present invention is not limited to an expert data set and a PU data set.

[1] Expert Data Set

The "expert data set" is a learning data set that can be used when learning a model of multi-class classification, and is composed of a plurality of partial data sets. Specifically, the expert data set is configured to meet the following conditions.

(A) At least some classes included in the correct answer candidate set Y are assigned as a scope of responsibility to each of the plurality of partial data sets.

(B) All classes included in the correct answer candidate set Y are assigned to any of the plurality of partial data sets.

(C) To each data included in a partial data set there is given any of the classes belonging to the scope of responsibility assigned to the partial data set, or there is attached a weak label indicating that the class of the recognition object does not belong to the scope of responsibility of the partial data set.

From the condition (C), the weak label set Z in the expert data set includes each class included in the correct answer candidate set Y and a label indicating being outside the scope of responsibility of each partial data set. When the data x, which is an element of the data space X, belongs to the true class y, which is an element of the correct answer candidate set Y, the weak label to be attached to the data x is determined by which partial data set this data x is included in. If the scope of responsibility of the partial data set including the data x includes the true class y, the weak label z attached to the data x indicates the true class y. On the other hand, if the scope of responsibility of the partial data set including the data x does not include the true class y, the data x is given a weak label z indicating that "the true class is outside the scope of responsibility of the partial data set". In this manner, even for data x that belongs to the same class y, what the weak label z to be attached thereto is determined by a probabilistic factor, that is to say, which partial data set it is included in. Moreover, the condition (B) guarantees that the mixing matrix H exists for the probability distribution that determines the weak label. Accordingly, the expert data set meets the requirements of a "data set having attached thereto a weak label" used in the present invention.

Figure 1B:
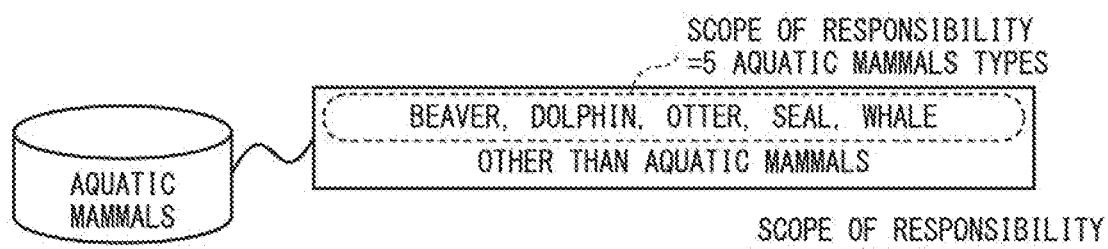
FIG. 1B shows an example of a weak label data set (expert data set) in a case of a multi-class classification problem.
Figure 1B:
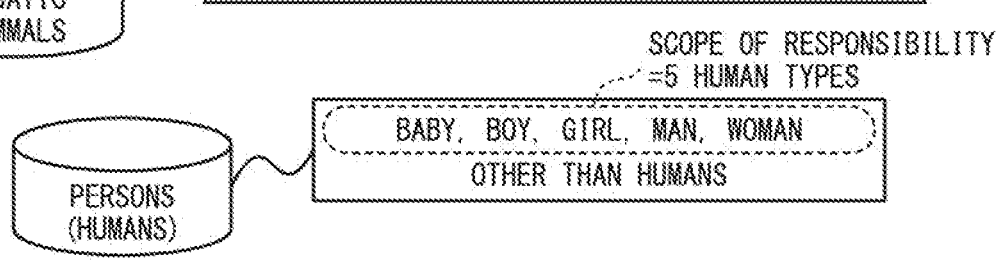

FIG. 1B shows an example of the expert data set. Now, it is assumed that an object recognition model is learned for performing multi-class classification of 100 classes on the basis of image data. In the expert data set, a plurality of partial data sets are prepared. In the example of FIG. 1B, there are prepared a plurality of partial data sets such as "aquatic mammals" and "persons". Also, a scope of responsibility is set for each partial data set. Five types of aquatic mammals, "beaver", "dolphin", "otter", "seal", and "whale" are assigned to the partial data sets of "aquatic mammals" as a scope of responsibility. Five types of persons, "baby", "boy", "girl", "man", and "woman" are assigned to the partial data set "persons" as a scope of responsibility. Here, each scope of responsibility is determined so that all classes included in the correct answer candidate set Y are included in the scope of responsibility of at least one partial data set. That is to say, 100 classes are assigned to a plurality of partial data sets so that there will be no classes that are not assigned to any of the partial data sets. In other words, the plurality of partial data sets determine the scopes of responsibility to cover all 100 classes of recognition objects. This enables learning of multi-class classification of 100 classes even with the expert data set.

In the expert data set, for each image data included in each partial data set, there is prepared a correct answer label indicating any one of the categories belonging to the scope of responsibility, or a label indicating that the category of the image data does not belong to the scope of responsibility of the partial data set. In the example of FIG. 1B, for the image data included in the partial data set of "aquatic mammals", there is prepared a correct answer label indicating any one of "beaver", "dolphin", "otter", "seal", and "whale", or a label "not an aquatic mammal" indicating that the category of the image data does not belong to the scope of responsibility of the partial data set. For example, if an image of a "baby" is included in the partial data set of "aquatic mammals", the "not an aquatic mammal" label is attached to this image.

By using such an expert data set, the workload of annotating correct answers to learning data is reduced significantly. In the case of a normal data set shown in FIG. 1A, it is necessary to attach one of the 100 categories as a correct answer label to all of the prepared image data. For example, in a case where 60,000 image data are prepared as learning data, it is necessary to assign one of the 100 categories as a correct answer label to all of the image data. On the other hand, in the case of the expert data set shown in FIG. 1B, the 60,000 image data are divided into, for example, 20 sets to prepare 20 partial data sets. Moreover, the 100 categories serving as recognition objects are divided into 20 sets, and 5 categories are assigned to each partial data set as scopes of responsibility. In this way, as shown in FIG. 1B, to the image data belonging to each partial data set, there may be attached any of a total of 6 correct answer labels, that is, correct answer labels for the five categories belonging to the partial data set, or correct answer labels indicating not belonging to the scope of responsibility of the partial data set. That is to say, any of the 6 correct answer labels may be attached to each partial data set.

[2] PU Data Set

A PU data set will be described as an example of a data set having attached thereto another weak label.

The PU data set is a data set of a two-class classification problem for classifying the data x, which is an element of the data space X, into a positive class (represented as P) and a negative class (represented as N). In the two-class classification problem dataset, to the data x there is attached a label indicating whether it belongs to P or N. That is to say, a true correct label is attached to all of the data included in the data set. On the other hand, to the data x of the PU data set, there is attached a label indicating that the data x belongs to P or a label (represented as U) indicating that the true correct answer is unknown. That is to say, the PU data set has a weak label set Z, which includes a label indicating belonging to P and a label indicating that the true correct answer is unknown.

If the data x, which is an element of the data space X, belongs to the true correct answer class P, then which one of the element P and U of the weak label set Z is attached to the data x is determined probabilistically. On the other hand, if the data x belongs to the true correct class N, the weak label to be attached to the data x is U with a probability of 1.

In the case where a high level of expertise or cost are required to identify the true correct answer class, the workload of annotating correct answers to learning data is reduced significantly by using the PU data set. This will be described by taking medical image identification as an example of identifying whether an input image includes a pathological abnormality (positive class/P) or is normal (negative class/N). In order to judge whether or not an image includes a pathological abnormality, a high level of medical expertise is required. Therefore, in order to create a normal data set for learning a two-class classification problem, it is necessary for a physician to check all images and annotate them with correct answers. On the other hand, in order to create a PU data set, it is not necessary to make a diagnosis for all images, and when a certain number of images including a pathological abnormality (that is, P) have been collected, a weak label U is attached to all of the remaining images to complete the creation of learning data.

Figure 2:
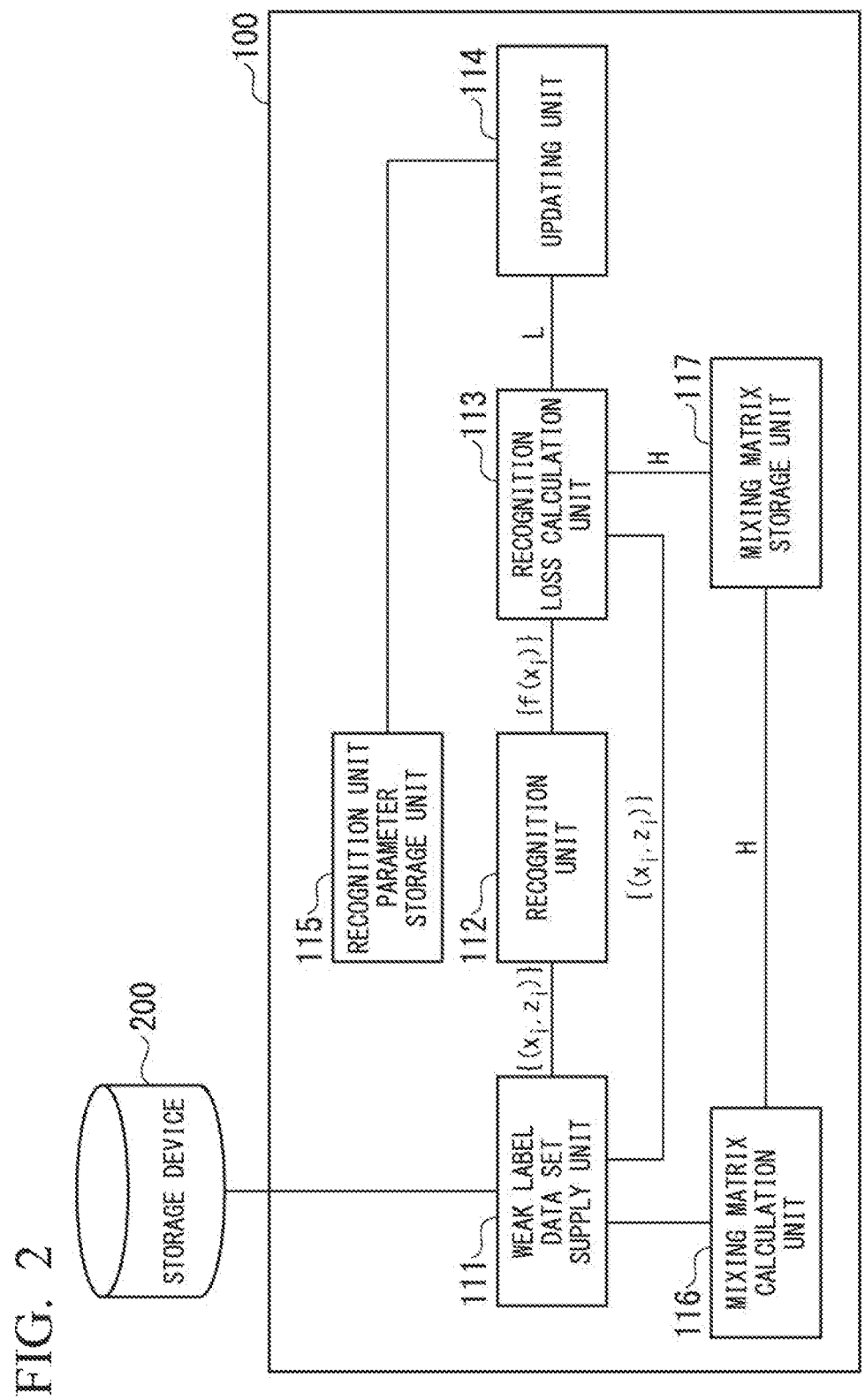
FIG. 2 is a block diagram showing a functional configuration of a learning device.

Next, an example embodiment of the learning device using an expert data set will be described. FIG. 2 is a block diagram showing a functional configuration of the learning device according to the example embodiment. It should be noted that this learning device 100 is to learn a multi-class classification model. The learning device 100 includes a weak label data set supply unit 111, a recognition unit 112, a recognition loss calculation unit 113, an updating unit 114, a recognition unit parameter storage unit 115, a mixing matrix calculation unit 116, and a mixing matrix storage unit 117. The learning device 100 performs learning processing using an expert data set, which is a learning data set stored in a storage device 200.

The weak label data set supply unit 111 supplies input data of the weak label data set described above to the recognition unit 112 and the recognition loss calculation unit 113, using the expert data set stored in the storage device 200. Specifically, the weak label data set supply unit 111 supplies a combination $\{x_i, z_i\}$ of data $x_i$ and a weak label $z_i$ (hereinafter, referred to as "input data combination") to the recognition unit 112 and the recognition loss calculation unit 113. The recognition unit 112 internally has a recognition model composed of a neural network or the like. The recognition unit 112 performs recognition processing using the recognition model for the input $x_i$, which is image data, and outputs the recognition result $f(x_i)$ to the recognition loss calculation unit 113. The recognition result $f(x_i)$ is a vector having the same number of dimensions as the number of elements of the correct answer candidate set Y, and each component thereof is a real value representing the relative likelihood of each class. In general, each component of the recognition result $f(x_i)$ may take an arbitrary real value. However, it may be normalized with a non-negative value as necessary so that the sum of respective components is 1. The normalization method commonly uses a softmax function, however, it is not limited to this method.

On the other hand, the mixing matrix calculation unit 116 calculates the mixing matrix H on the basis of the attribute value of the weak label data set, and supplies it to the mixing matrix storage unit 117. The mixing matrix will be described in detail later. The mixing matrix storage unit 117 stores the supplied mixing matrix H, and supplies it to the recognition loss calculation unit 113.

The recognition loss calculation unit 113 uses the input data combination $\{x_i, z_i\}$ supplied from the weak label data set supply unit 111, the recognition result $f(x_i)$ supplied from the recognition unit 112, and the mixing matrix H to calculate a recognition loss L, and supplies it to the updating unit 114. The recognition loss L will be described in detail later. The updating unit 114 updates a parameter constituting the recognition model of the recognition unit 112 on the basis of the recognition loss L, and supplies the updated parameter to the recognition unit parameter storage unit 115. The recognition unit parameter storage unit 115 stores the updated parameter supplied from the updating unit 114. The recognition unit 112 reads out the parameter stored in the recognition unit parameter storage unit 115 at a timing of updating the parameter, and sets it as a parameter of the time of performing the recognition processing. In this way, the recognition unit 112 performs learning, using the weak label data set as learning data.

Figure 3:
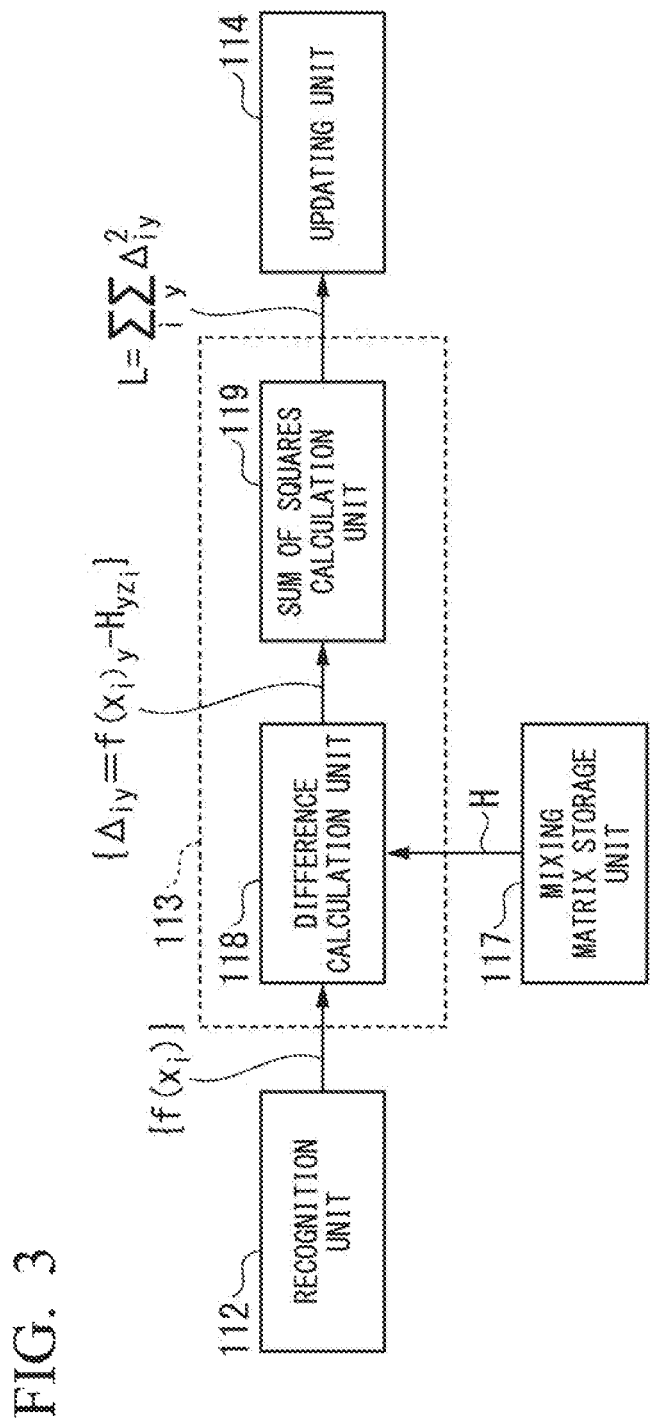
FIG. 3 is a block diagram showing a detailed functional configuration of a recognition loss calculation unit.

FIG. 3 is a block diagram showing a detailed functional configuration of the recognition loss calculation unit 113. The recognition loss calculation unit 113 includes a difference calculation unit 118 and a sum of squares calculation unit 119. The difference calculation unit 118 calculates the difference $\Delta_i$ between the recognition result supplied from the recognition unit 112 and the mixing matrix H supplied from the mixing matrix storage unit 117. The sum of squares calculation unit 119 calculates the sum of squares of the difference $\Delta_i$ supplied from the difference calculation unit 118 and supplies it to the updating unit 114 as a loss function L.

(Mixing Matrix)

First, the mixing matrix H will be described in detail. The mixing matrix H is a rectangular matrix having the same number of rows as the number of elements in the correct answer candidate set Y and the same number of columns as the number of elements in the weak label set Z. Among matrices having this form, one that satisfies Equation (4) is employed as the mixing matrix H. That is to say, if a matrix M has the same number of rows as the number of elements in the weak label set Z and the same number of columns as the number of elements in the correct answer candidate set Y where the z-th row and y-th column components thereof are represented in a form of

[Equation 6]

$$M_{zy}=p(z|y) \qquad (6)$$

as in Equation (6) above, then the mixing matrix H is a left inverse matrix $M^+$ thereof.

[Equation 7]

$$H=M^+ \qquad (7)$$

According to Equation (7), the mixing matrix calculation unit 116 calculates the left inverse matrix $M^+$ of the matrix M given by Equation (6) to thereby calculate the mixing matrix H. If the number of elements of the correct answer candidate set Y and the number of elements of the weak label set Z are different, there are an infinite number of left inverse matrices of the matrix M, however, any one of them may be used.

(Recognition Loss)

Next, the recognition loss calculated by the recognition loss calculation unit 113 will be described in detail. When learning is performed using a weak label data set, a loss function is defined using the mixing matrix H. However, conventionally, a mixing matrix is used as the weight of the weighted sum of semi-positive definite functions, and since the elements of the mixing matrix have negative values, the resulting loss function can take a negative value. When the loss function can take a negative value, the negatively weighted term increases endlessly upon execution of learning, and this hinders learning. Therefore, in the present example embodiment, instead of using the mixing matrix H as the weight of the weighted sum, it is used as the value of an objective function, and the squared error between the recognition result and the objective function is set as the loss function L, thereby solving the problem mentioned above.

Conventionally, the loss function L is calculated for a set $\{(x_i, z_i)\}$ of the combination $(x_i, z_i)$ of input data $x_i$ and a weak label $z_i$ attached thereto, by means of the following two steps. In the first step, the loss $l(f(x_i), y)$ between the recognition result $f(x_i)$ and each element y of the correct answer candidate set Y is calculated, using the semi-positive definite function 1. In the second step, the loss calculated in the first step is weighted by the mixing matrix H and summed up across the learning data. As a result, the loss function L is defined as follows.

[Equation 8]

$$L=\Sigma_i\Sigma_y H_{yz_i}l(f(x_i)y) \qquad (8)$$

On the other hand, in the present example embodiment, the difference $\Delta_i$ between the recognition result $f(x_i)$ and the mixing matrix H is calculated in the first step. The difference $\Delta_i$ is a vector having the same number of dimension as the number of elements of the correct answer candidate set Y, and the y-th component thereof is calculated on the basis of the following equation.

[Equation 9]

$$\Delta_{iy}=f(x_i)_y-H_{yz_i} \qquad (9)$$

Then, in the second step, each component of $\Delta_i$ calculated in the first step is squared and summed up across the learning data. As a result, the loss function is calculated as follows.

[Equation 10]

$$L=\Sigma_i\Sigma_y|f(x_i)_y-H_{yz_i}|^2 \qquad (10)$$

As shown by Equation (10), the loss L is a semi-positive definite function as a whole as a result of taking the difference from the mixing matrix H before taking the sum of squares. As a result, it is possible to execute learning based on the semi-positive definite loss function even from the weak label data set.

(Learning Processing by Learning Device)

Figure 4:
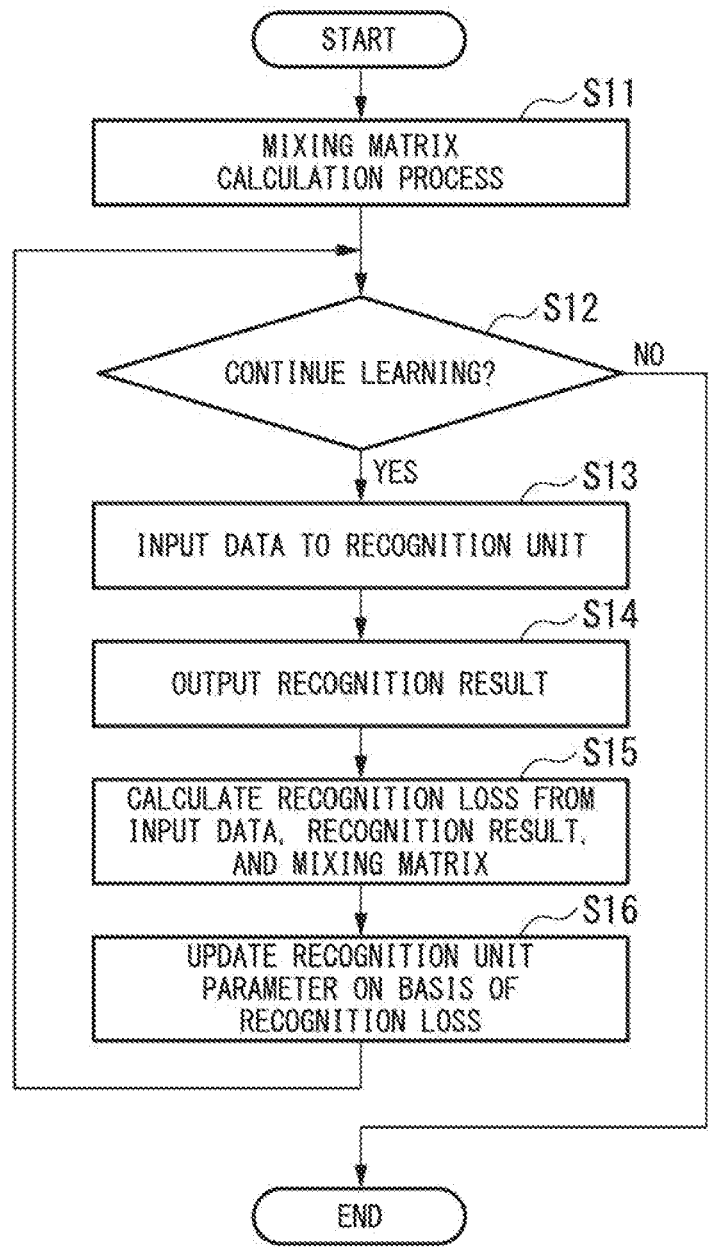
FIG. 4 is a flowchart showing operations of the learning device.

FIG. 4 is a flowchart of the learning processing performed by the learning device 100. First, by means of the method described above, the mixing matrix calculation unit 116 calculates a mixing matrix H, using a weak label probability distribution included in the weak label data set (Step S11). The mixing matrix calculation unit 116 outputs the calculated mixing matrix H to the mixing matrix storage unit 117, and the mixing matrix storage unit 117 stores the input mixing matrix H.

Next, the learning device 100 determines whether or not to continue the learning (Step S12). This determination is performed on the basis of whether or not a predetermined termination condition is met. Examples of the termination condition include whether or not all of prepared learning data has been used, and whether or not the number of parameter updates has reached a predetermined number.

If it is determined to continue the learning (Step S12: Yes), the weak label data set supply unit 111 inputs an input data combination to the recognition unit 112 and the recognition loss calculation unit 113 (Step S13). The recognition unit 112 performs recognition processing on the basis of the input data, and outputs the recognition result to the recognition loss calculation unit 113 (Step S14).

Next, the recognition loss calculation unit 113 calculates the recognition loss L according to Equation (8) described above, using the input data, the recognition result, and the mixing matrix (Step S15). Then, the updating unit 114 updates the parameter of the recognition unit 112 so that the calculated recognition loss L becomes small (Step S16). That is to say, the recognition unit parameter storage unit 115 stores the updated parameter, and the recognition unit 112 sets the updated parameter stored in the recognition unit parameter storage unit 115 for the learning processing, for the model to be learned. The learning device 100 thus repeats Step S12 to Step S16, and if it is determined in Step S12 that the learning is not to be continued (Step S12: No), the processing ends.

Figure 5:
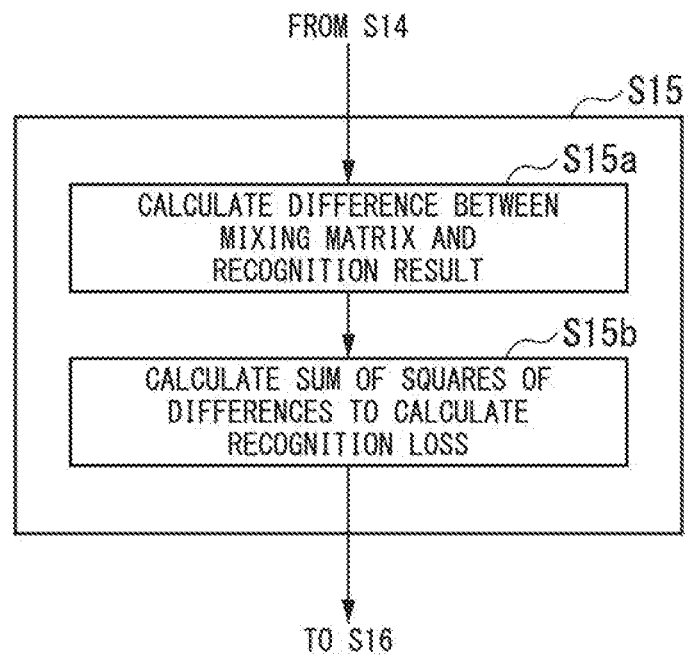
FIG. 5 is a flowchart showing operations of the recognition loss calculation unit.

FIG. 5 is a flowchart showing in detail processes of the operation of the recognition loss calculation unit 113.

On the basis of Equation (9), the difference calculation unit 118 calculates the difference $\Delta_i$ between the recognition result supplied from the recognition unit 112 and the mixing matrix H supplied from the mixing matrix storage unit 117 (Step S15a). The difference calculation unit 118 outputs the calculated difference $\Delta_i$ to the sum of squares calculation unit 119.

On the basis of Equation (10), the sum of squares calculation unit 119 calculates the sum of squares of the difference $\Delta_i$ supplied from the difference calculation unit 118 (Step S15b). The sum of squares calculation unit 119 supplies the calculated sum of squares of the difference $\Delta_i$ to the updating unit 114 as a recognition loss L.

Figure 6:
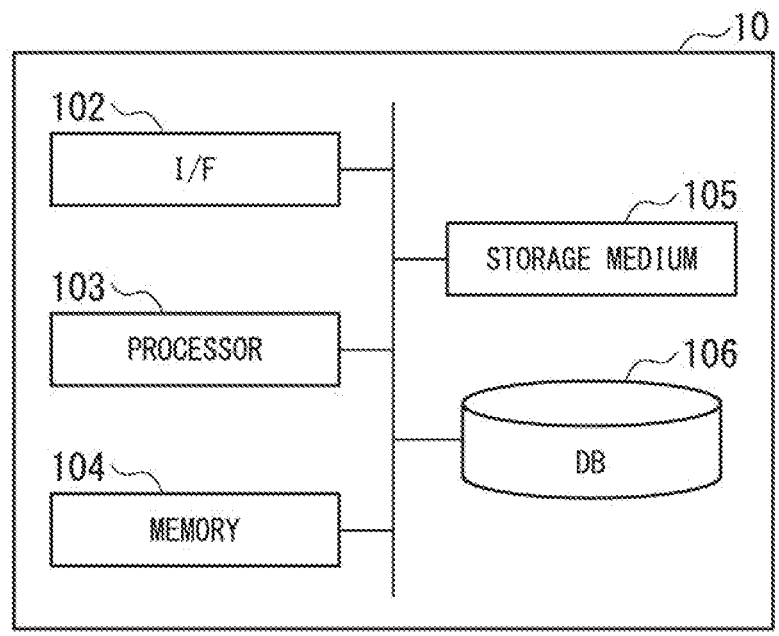
FIG. 6 is a block diagram showing an example of a hardware configuration of the learning device.

Next, an example of hardware configuration in the learning device 100 will be described. FIG. 6 is a diagram showing an example of a hardware configuration of the learning device 100. FIG. 6 shows a computer device 10 as a device for realizing the learning device 100. The computer device 10 is an arbitrary computer device. Examples of the computer device 10 include a personal computer (PC), a server machine, a tablet terminal, and a smartphone. Moreover, the computer device 10 may be a dedicated computer device designed to realize the learning device 100, or may be a general-purpose computer device.

The computer device 10 includes an interface 102, a processor 103, a memory 104, a storage medium 105, and a database (DB) 106.

The interface 102 performs inputs and outputs of data to and from an external device. Specifically, the weak label data set used for learning that is performed by the learning device 100 realized by the computer device 10 is input through the interface 102.

The processor 103 is a computer such as CPU (central processing unit) or CPU and GPU (graphics processing unit), and controls the entire computer device 10 (learning device 100) by executing a preliminarily prepared program. Specifically, the processor 103 executes the learning process described above.

The memory 104 is composed of a ROM (read-only memory), a RAM (random access memory), or the like. The memory 104 stores a model learned by the computer device 10 (learning device 100). The memory 104 is also used as a working memory during execution of various processes performed by the processor 103.

The storage medium 105 is a non-transitory, non-temporary storage medium such as a disk-shaped storage medium or a semiconductor memory, and is configured to be removable from the computer device 10 (learning device 100). The storage medium 105 records various programs to be executed by the processor 103. When the computer device 10 (learning device 100) executes the various processes, a program recorded on the storage medium 105 is loaded into the memory 104 and executed by the processor 103.

The database 106 stores weak label data sets used for learning. In addition to the above, the computer device 10 (learning device 100) may include an input device, such as a keyboard and mouse for a user to perform instructing and inputting, and a display unit.

Figure 7:
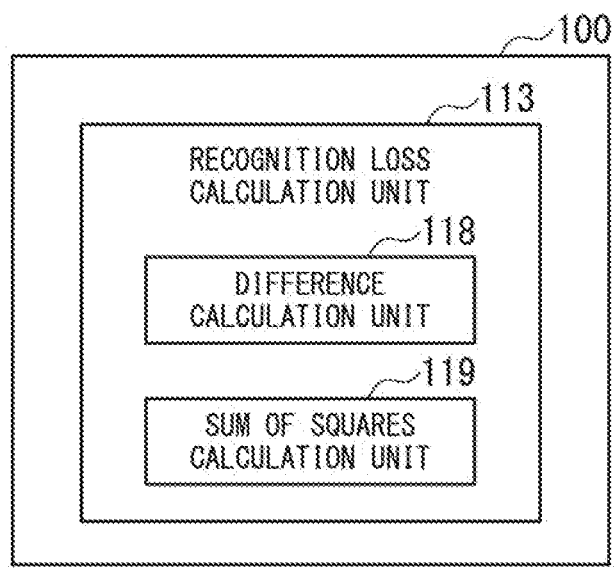
FIG. 7 is a diagram showing an illustration of a minimum configuration of the learning device.
Figure 8:
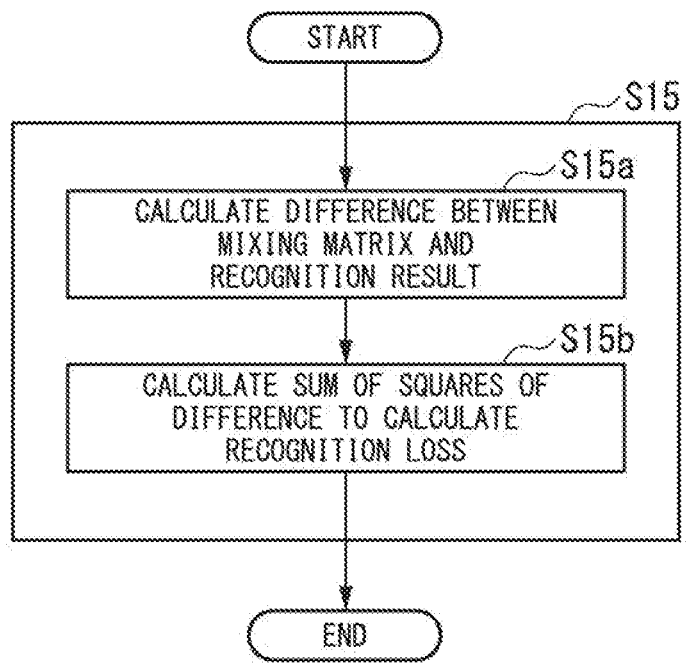
FIG. 8 is a flowchart showing operations of the learning device in the minimum configuration.

FIG. 7 is a diagram showing an illustration of a minimum configuration of the learning device 100. FIG. 8 is a diagram showing an illustration of a processing flow of the learning device 100 in the minimum configuration.

The learning device 100 includes the recognition loss calculation unit 113. The recognition loss calculation unit 113 calculates a recognition loss using: a recognition result with respect to recognition object data in a learning data set, which is a set of combinations of recognition object data and weak labels; a mixing matrix calculated on the basis of the learning data set; and the weak label attached to the recognition object data (Step S15).

The learning data set includes a weak label probability distribution. The weak label probability distribution is a probability distribution followed by the weak label conditioned by a true correct answer class to which the recognition object data belongs, and has a left inverse matrix when the weak label is regarded as a row index and the true correct answer class is regarded as a column index.

The recognition loss calculation unit 113 includes the difference calculation unit 118 and the sum of squares calculation unit 119.

The difference calculation unit 118 calculates the difference between the mixing matrix and the recognition result (Step S15a).

The sum of squares calculation unit 119 calculates the sum of squares of the difference to calculate a recognition loss (Step S15b).

As described above, in the case of using a learning data set that has weak labels attached thereto and is defined preliminarily, the learning device 100 can calculate a semi-positive definite loss function from the learning data with the weak labels attached thereto. As a result, the learning device 100 can perform recognition model learning while avoiding overfitting.

The present disclosure has been described in detail with reference to the example embodiment and working examples, however, the present disclosure is not to be considered limited to the above example embodiment and working examples. Various modifications that can be understood by those skilled in the art may be made to the configurations and/or details of the present disclosure, without departing from the scope of the disclosure.

REFERENCE SYMBOLS

100 Learning device
111 Weak label data set supply unit
112 Recognition unit
113 Recognition loss calculation unit
114 Updating unit
115 Recognition unit parameter storage unit
116 Mixing matrix calculation unit
117 Mixing matrix storage unit
118 Difference calculation unit
119 Sum of squares calculation unit

What is claimed is:

1. A learning device comprising:
at least one memory configured to store instructions; and
at least one processor configured to execute the instructions to:
calculate a recognition loss using: a recognition result with respect to recognition object data in a learning data set that is a set of a pair of the recognition object data and a weak label; a mixing matrix calculated based on the learning data set; and the weak label attached to the recognition object data, wherein the learning data set comprises a weak label probability distribution,
the weak label probability distribution is a probability distribution followed by the weak label conditioned by a true correct answer class to which the recognition object data belongs, and has a left inverse matrix when the weak label is regarded as a row index and the true correct answer class is regarded as a column index, calculating the recognition loss by the at least one processor comprises:

calculating a difference between the mixing matrix and the recognition result; and calculating the recognition loss by calculating a sum of a square of the difference, and the at least one processor is configured to execute the instructions to further update a parameter of a recognition model based on the recognition loss.

2. The learning device according to claim 1, wherein the at least one processor is configured to execute the instructions to further:

output the recognition result with respect to the recognition object data in the learning data set; and calculate the mixing matrix based on the learning data set.

3. The learning device according to claim 1, wherein the at least one processor is configured to execute the instructions to further:

supply the learning data set.

4. The learning device according to claim 1, wherein the learning data set is either an expert data set or a positive class-unknown class (PU) data set.

5. A learning method executed by a computer and the method comprising:

calculating a recognition loss using: a recognition result with respect to recognition object data in a learning data set that is a set of a pair of the recognition object data and a weak label; a mixing matrix calculated based on the learning data set; and the weak label attached to the recognition object data, wherein the learning data set comprises a weak label probability distribution, the weak label probability distribution is a probability distribution followed by the weak label conditioned by a true correct answer class to which the recognition object data belongs, and has a left inverse matrix when the weak label is regarded as a row index and the true correct answer class is regarded as a column index, calculating the recognition loss comprises:

calculating a difference between the mixing matrix and the recognition result; and calculating the recognition loss by calculating a sum of a square of the difference, and the learning method further comprises updating a parameter of a recognition model based on the recognition loss.

6. A non-transitory storage medium storing a program for a learning device, the program executable by having recorded therein a program which causes a computer to execute perform a learning method comprising:

calculating a recognition loss using: a recognition result with respect to recognition object data in a learning data set that is a set of a pair of the recognition object data and a weak label; a mixing matrix calculated based on the learning data set; and the weak label attached to the recognition object data, wherein the learning data set comprises a weak label probability distribution, the weak label probability distribution is a probability distribution followed by the weak label conditioned by a true correct answer class to which the recognition object data belongs, and has a left inverse matrix when the weak label is regarded as a row index and the true correct answer class is regarded as a column index, calculating the recognition loss comprises:

calculating a difference between the mixing matrix and the recognition result; and calculating the recognition loss by calculating a sum of a square of the difference, and the learning method further comprises updating a parameter of a recognition model based on the recognition loss.

* * * * *